V. LANCIA.
CHANGE SPEED GEAR.
APPLICATION FILED JUNE 4, 1912.
1,128,694.
Patented Feb. 16, 1915.
3 SHEETS—SHEET 1.
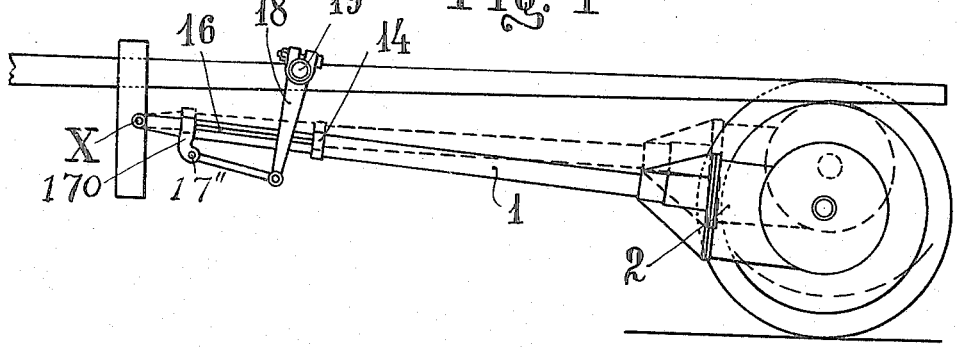
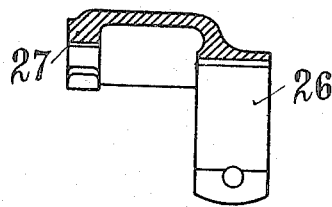
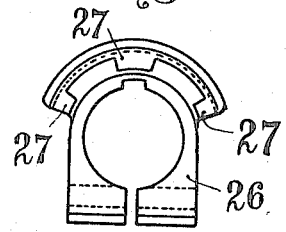
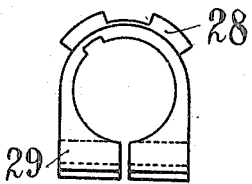
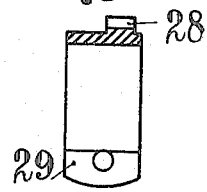
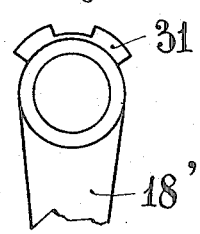
Witnesses:
H. K. Boulter
R. B. Smith
Inventor:
Vincenzo Lancia
By Wm. E. Boulter
attorney

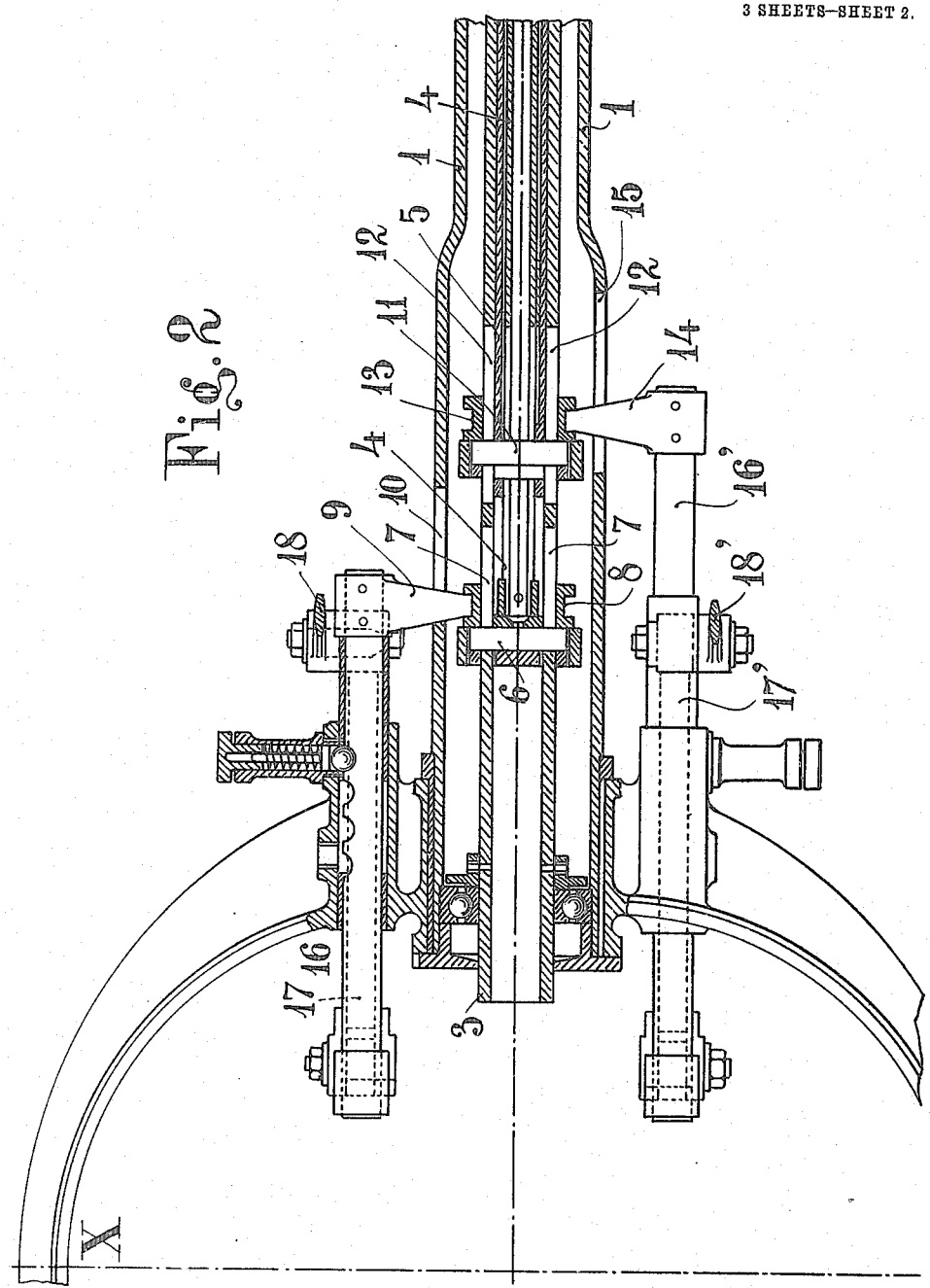

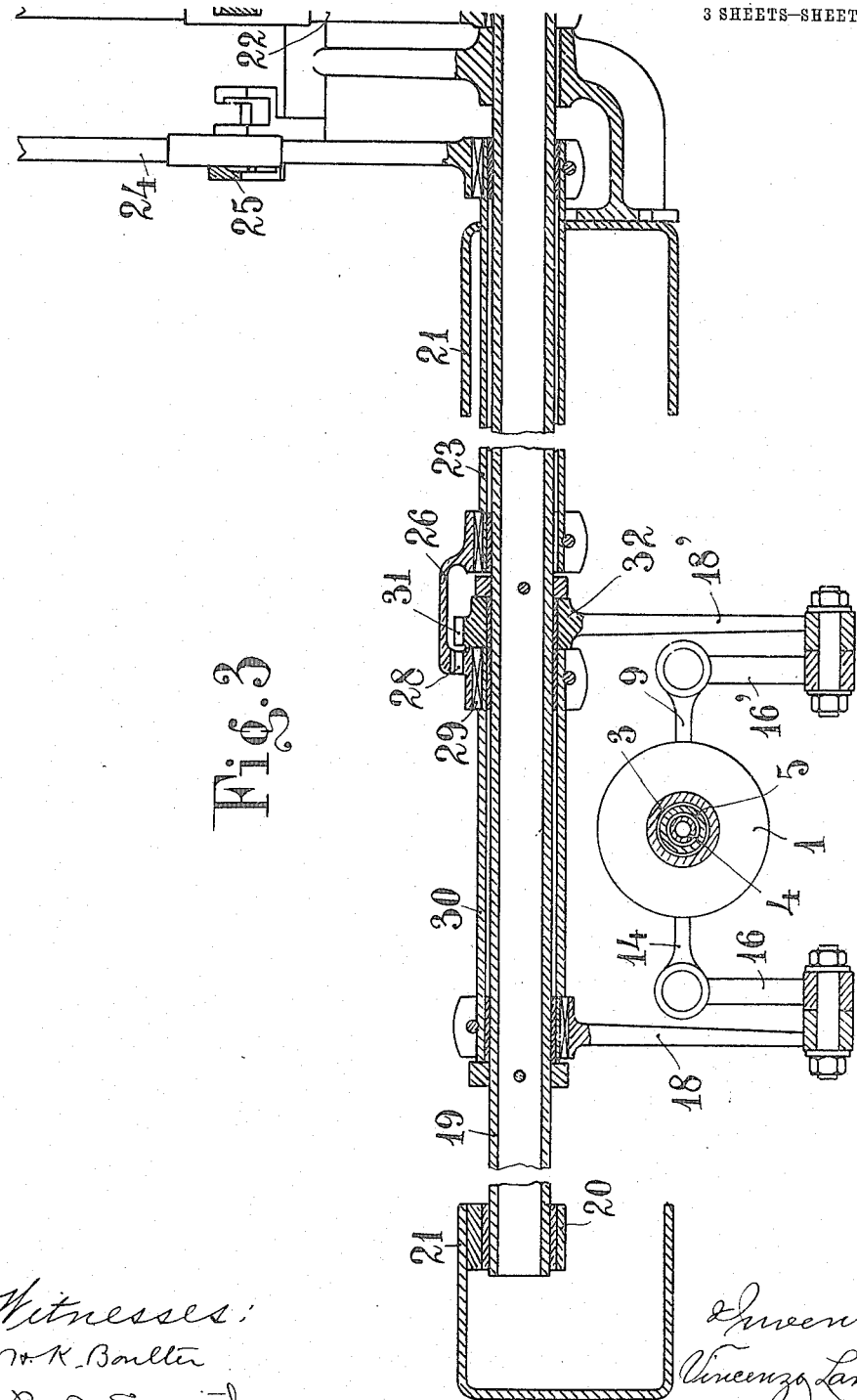

UNITED STATES PATENT OFFICE.

VINCENZO LANCIA, OF TURIN, ITALY.

CHANGE-SPEED GEAR.

1,128,694.   Specification of Letters Patent.   Patented Feb. 16, 1915.

Application filed June 4, 1912.   Serial No. 701,643.

*To all whom it may concern:*

Be it known that I, VINCENZO LANCIA, a subject of the King of Italy, residing at Turin, in Italy, have invented certain new and useful Improvements in Change-Speed Gear, of which the following is a specification.

This invention relates to means for controlling the change of speed in motor-cars, more particularly applicable to those types in which the change speed gear, being mounted on the rear axle, is caused to oscillate with the latter about a transverse axis situated in the front portion of the car, at a greater or less distance from the engine. In this case, the members transmitting to the change speed box the movements of the lever arranged within reach of the driver, must be connected to the driving shaft in such manner as to follow the oscillations of the latter, consequently an ordinary control of the said members could not be used without running the risk that, owing to the oscillations of the rear axle, the position of the speeds would change independently of the will of the driver.

According to this invention, between the arms controlled directly by the change speed lever, and the corresponding connecting members is arranged such a connection or coupling that the position of the said connection relatively to the gear does not change even during the greatest oscillations of the rear axle, and consequently of the driving shaft. A construction of the controlling means, applied to a change speed gear with two direct drives controlled by connecting members inside the driving shaft, is illustrated by way of example in the accompanying drawings in which—

Figure 1 shows diagrammatically in side elevation the arrangement of the levers. Fig. 2 shows in sectional plan, on an enlarged scale, the front end of the driven shaft and of the connecting members. Fig. 3 is a cross-section of the cross-spindle and operating levers, Fig. 4 shows in plan the guide for the operating levers, and Figs. 5 and 6 are respectively longitudinal section and front elevation of the member used for throwing the operating lever into gear with the arm connected to one or the other of the connecting members. Figs. 7 and 8 are similar views of the clutch sleeve for the control of one connecting member, and Fig. 9 is a front elevation of a lever for the control of the other.

As will be seen in Figs. 1 and 2, the tube or radius rod 1 secured to the change speed gear box 2 which is secured to the rear axle of the car, is mounted so as to be able to oscillate about the axis $x$—$x$, in order to allow of the oscillations of the rear axle to which it is secured. This tube 1 contains the driving shaft 3, within which are arranged the two concentric connecting members 4 and 5 adapted to operate the toothed wheels of the change speed gear. The front end of the member or rod 4 is connected by means of a pin 6 passing through two longitudinal slots 7 provided in the shaft 3, to a collar 8 operated from the outside by means of a fork 9 passing through the slot 10 of the tube 1. In the same way, the front end of the rod 5 is connected by a pin 11 passing through two longitudinal slots 12 of the shaft 3, to a collar 13 operated from the outside by means of a fork 14 passing through a slot 15 of the tube 1. Each of the forks 9 and 14 is connected to a rod 16 or 16′ (Figs. 1 and 2) which, at its other end, is provided with an intermediate member or bracket 170 which is pivoted at 17″, to a rod 17 or 17′, and the latter is in its turn pivoted at its other end to the arm 18 or 18′ mounted on the cross-spindle 19.

The rods 16 and 16′ connected to the forks 9 or 14, are provided with an ordinary ball stop such as shown in Fig. 2. Each of the arms 18 or 18′ can be operated by the lever controlling the change speed gear, in the following manner: On the cross-spindle 19 (Fig. 3) pivoted in the bearings 20 of the longitudinal members 21 of the chassis and to which is secured the lever 22 used for manipulating the brake, is mounted a tubular sleeve 23 secured to the change speed lever 24 which, as in ordinary constructions, is guided in a gate 25 (Fig. 4). This tubular sleeve 23 is provided at its other end with a part 26 provided inside with teeth 27 (Figs. 5 and 6) by means of which it can engage the teeth 28 of a sleeve 29 secured by the tube 30 of the arm 18, or with the teeth 31 of the head 32 of the arm 18′. It will now be understood that, by shifting the lever 24 laterally, that is to say, along the axis of the spindle 19, which can be effected by means of the gate 25, the said lever can be coupled either to the arm

18 or to the arm 18', in order to operate the rod 5 or the rod 4. By turning the lever 24 on its pivot, the two arms 18 or 18' are rotated, and consequently, by means of the connecting rod 16 17 or 16' or 17', the movement required to bring the corresponding pinion of the change speed gear into or out of engagement, is transmitted to the forks 9 or 14. By examining Fig. 1, it will be clearly seen that in that way the movements which the tube 1 and the driving shaft with the control tie rods mounted in its interior, may experience owing to the oscillation of the rear axle, cannot affect in any way the position of the forks 9 or 14, that is to say, they do not produce any change in the position of the pinions, owing to the axis $x-x$ about which oscillates the rear axle, being near the point 17'' about which oscillate the rods 17 and 17' (see position shown in dotted lines in Fig. 1). The connecting members for the control of the change speed gear could be arranged outside, instead of inside, the driving shaft without departing from the spirit of the invention.

What I claim as my invention and desire to secure by Letters Patent is:—

1. In controlling mechanism for motor-car change-speed gears mounted on the rear axle of the car, a hollow driving shaft mounted in a tube and pivoted at the front of the car, means for controlling the change speed gear arranged inside said shaft and oscillating with it, a cross shaft arranged behind the forward end of said means, arms depending from said cross-shaft, means pivoted to said arms and to the corresponding controlling means for connecting them with each other, and means for operating the cross-shaft.

2. In controlling mechanism for motor-car change-speed gears mounted on the rear axle of the car, a hollow driving shaft mounted in a tube and pivoted at the front of the car, a rod for controlling the change speed gear, said rod being mounted inside said shaft and oscillating with the shaft, a fork engaging said rod, a bar connected to said fork and guided in a sleeve solid with the tube surrounding the shaft, said bar extending to a point near the center of oscillation of the driving shaft and controlling rod, a cross-shaft mounted behind the forward end of said bar, an arm depending from the cross-shaft, a connecting rod pivoted to said arm and to the end of the bar, and means for operating the cross-shaft.

3. In controlling mechanism for motor-car change-speed gears mounted on the rear axle of the car, a hollow driving shaft mounted in a tube and pivoted at the front of the car, a plurality of rods for controlling the change-speed gear, said rods being mounted concentrically inside said shaft and oscillating with the shaft, a plurality of forks, each engaging one of said rods, bars connected to said forks and guided in sleeves solid with the tube surrounding the shaft, said bars extending to a point near the center of oscillation of the driving shaft and controlling rods, a cross shaft mounted behind the forward end of said bars, arms depending from the cross-shaft, connecting rods each pivoted to one of said arms and to the end of the corresponding bar, and means for operating the cross-shaft.

4. In controlling mechanism for motor-car change-speed gears mounted on the rear axle of the car, a tube containing the driving shaft secured to the gear box and pivoted at the front of the car, a hollow driving shaft, rods in said shaft for controlling the change speed gear, bars engaging said controlling rods, each bar being guided in a sleeve solid with the tube and extending to a point near the center of oscillation of the shaft and controlling rods, a cross shaft mounted behind the forward end of said rod, arms depending from said cross-shaft and rods pivoted to the end of each arm and to the forward end of the corresponding connecting rod, and means for controlling the cross shaft.

In testimony whereof I have signed my name to this specification in the presence of two subscribing witnesses.

VINCENZO LANCIA.

Witnesses:
 JOCELYN GOUBEYRAN,
 CARLO TORBOT.

Copies of this patent may be obtained for five cents each, by addressing the "Commissioner of Patents, Washington, D. C."